US011838375B2

(12) United States Patent
Haase et al.

(10) Patent No.: US 11,838,375 B2
(45) Date of Patent: Dec. 5, 2023

(54) UNIVERSAL SOFTWARE COMMUNICATION BUS

(71) Applicant: Harman International Industries, Incorporated, Stamford, CT (US)

(72) Inventors: Robert Haase, Brighton, MI (US); Sowrabha Mysore Indukumar, Karnataka (IN); Pavithra Jayanth, Bangalore (IN); Grant Gatchel, Ypsilanti, MI (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 17/453,985

(22) Filed: Nov. 8, 2021

(65) Prior Publication Data
US 2022/0150317 A1    May 12, 2022

Related U.S. Application Data

(60) Provisional application No. 63/113,085, filed on Nov. 12, 2020.

(51) Int. Cl.
| | |
|---|---|
| *H04L 67/51* | (2022.01) |
| *H04L 67/01* | (2022.01) |
| *G06F 8/34* | (2018.01) |
| *G06F 8/61* | (2018.01) |
| *H04L 41/0853* | (2022.01) |

(52) U.S. Cl.
CPC ............... *H04L 67/51* (2022.05); *G06F 8/34* (2013.01); *G06F 8/61* (2013.01); *H04L 41/0853* (2013.01); *H04L 67/01* (2022.05)

(58) Field of Classification Search
CPC ..... H04L 67/51; H04L 67/01; H04L 41/0853; G06F 8/34; G06F 8/61
USPC .................................................. 709/223, 224
See application file for complete search history.

(56) References Cited

U.S. PATENT DOCUMENTS

| | | | | |
|---|---|---|---|---|
| 6,067,568 A * | 5/2000 | Li | ............................ | H04L 41/00 709/223 |
| 7,013,469 B2 * | 3/2006 | Smith | ...................... | G06F 9/465 719/318 |
| 7,451,476 B1 * | 11/2008 | Banks | .................... | H04L 63/105 713/153 |
| 7,814,218 B1 * | 10/2010 | Knee | ........................ | H04L 69/18 709/230 |
| 7,983,254 B2 * | 7/2011 | Alt | ....................... | H04L 12/4633 709/227 |
| 8,111,620 B1 * | 2/2012 | Swan | .................... | H04L 12/2861 370/230 |
| 8,184,530 B1 * | 5/2012 | Swan | ..................... | H04W 76/12 370/230 |
| 8,191,040 B2 * | 5/2012 | Hejlsberg | ................... | G06F 9/44 717/114 |
| 8,934,487 B2 * | 1/2015 | Vogt | .................... | H04L 63/0407 709/224 |

(Continued)

*Primary Examiner* — Thu Ha T Nguyen
(74) *Attorney, Agent, or Firm* — McCoy Russell LLP

(57) ABSTRACT

Methods and systems are provided for a device for a communications control system. In one example, the device includes a distributed component interconnect framework (DCIF) configured to enable communication between different software modules of a communications network based on already existing code. The DCIF allows simultaneous communication between multiple transport protocols.

19 Claims, 5 Drawing Sheets

(56) References Cited

U.S. PATENT DOCUMENTS

| | | | | |
|---|---|---|---|---|
| 8,949,382 B2* | 2/2015 | Cornett | | H04L 41/0806 709/220 |
| 9,992,064 B1* | 6/2018 | Chawla | | H04L 41/082 |
| 10,057,131 B1* | 8/2018 | Brown | | H04L 41/12 |
| 10,374,956 B1* | 8/2019 | Tracy | | H04L 67/1089 |
| 10,708,129 B1* | 7/2020 | Levin | | H04L 41/0816 |
| 11,489,883 B2* | 11/2022 | Vanderheeren | | H04M 3/563 |
| 2003/0204599 A1* | 10/2003 | Trossen | | H04L 69/329 709/227 |
| 2004/0199370 A1* | 10/2004 | Arama | | H04L 43/50 703/20 |
| 2006/0098642 A1* | 5/2006 | Mallya | | H04J 3/12 370/539 |
| 2006/0168318 A1* | 7/2006 | Twiss | | H04L 67/1085 709/238 |
| 2006/0276226 A1* | 12/2006 | Jiang | | H04W 8/183 455/433 |
| 2008/0049619 A1* | 2/2008 | Twiss | | H04L 45/04 370/236 |
| 2008/0126958 A1* | 5/2008 | Louie | | G06F 3/0481 715/764 |
| 2008/0313691 A1* | 12/2008 | Cholas | | H04L 12/2856 386/241 |
| 2009/0165142 A1* | 6/2009 | Adelstein | | H04L 43/0876 726/26 |
| 2011/0167165 A1* | 7/2011 | Bryan | | H04L 69/03 709/230 |
| 2011/0246748 A1* | 10/2011 | Talwar | | G06F 9/5077 712/30 |
| 2011/0277018 A1* | 11/2011 | Weizman | | H04L 61/4535 709/227 |
| 2012/0011233 A1* | 1/2012 | Dixon | | H04L 12/2827 709/221 |
| 2012/0092995 A1* | 4/2012 | Arvidsson | | H04W 28/02 370/235 |
| 2012/0281139 A1* | 11/2012 | Zhang | | G06T 3/0012 348/468 |
| 2013/0013688 A1* | 1/2013 | Wang | | H04L 67/51 709/204 |
| 2013/0179330 A1* | 7/2013 | Quillian | | G06F 21/6245 705/38 |
| 2014/0108506 A1* | 4/2014 | Borzycki | | H04L 67/1095 709/204 |
| 2014/0115047 A1* | 4/2014 | Zhou | | H04L 67/01 709/204 |
| 2014/0192708 A1* | 7/2014 | Wise | | H04B 7/18513 370/316 |
| 2014/0195609 A1* | 7/2014 | Wise | | H04L 65/403 709/204 |
| 2014/0201262 A1* | 7/2014 | Woo | | H04L 67/01 709/203 |
| 2015/0117623 A1* | 4/2015 | Fandrianto | | H04M 7/0051 379/93.05 |
| 2015/0143363 A1* | 5/2015 | Gombert | | G06F 9/5083 718/1 |
| 2015/0178835 A1* | 6/2015 | Quillian | | G06Q 40/02 705/37 |
| 2015/0281005 A1* | 10/2015 | Kasturi | | H04L 67/1004 709/223 |
| 2016/0205519 A1* | 7/2016 | Patel | | H04L 67/1008 455/518 |
| 2016/0262184 A1* | 9/2016 | Wentink | | H04L 67/52 |
| 2016/0330252 A1* | 11/2016 | Stahl | | H04L 65/1069 |
| 2017/0034224 A1* | 2/2017 | Baram | | H04L 65/765 |
| 2017/0142035 A1* | 5/2017 | Bradley | | H04L 51/52 |
| 2017/0188054 A1* | 6/2017 | Ma | | H04L 67/563 |
| 2017/0311224 A1* | 10/2017 | Wang | | H04L 61/2517 |
| 2018/0255019 A1* | 9/2018 | Fontaine | | H04L 67/04 |
| 2018/0287903 A1* | 10/2018 | Joshi | | H04L 43/062 |
| 2019/0182155 A1* | 6/2019 | Chang | | H04L 45/24 |
| 2019/0253318 A1* | 8/2019 | Leng | | H04L 41/22 |
| 2020/0059694 A1* | 2/2020 | Ju | | H04N 13/156 |
| 2020/0213685 A1* | 7/2020 | Snyder | | H04N 21/4782 |
| 2020/0272600 A1* | 8/2020 | Natanzon | | G06F 3/0644 |
| 2021/0019194 A1* | 1/2021 | Bahl | | H04L 67/1031 |
| 2021/0092056 A1* | 3/2021 | Wijnands | | H04L 12/185 |
| 2021/0192867 A1* | 6/2021 | Fang | | G07C 5/0816 |
| 2021/0289023 A1* | 9/2021 | Mikityuk | | H04L 67/51 |
| 2021/0385230 A1* | 12/2021 | Joshi | | H04L 63/126 |
| 2022/0024407 A1* | 1/2022 | Cho | | B60W 50/14 |
| 2022/0066998 A1* | 3/2022 | Jha | | G06N 7/005 |
| 2022/0125805 A1* | 4/2022 | Martinez-Montemayor | | A61K 36/074 |
| 2022/0337603 A1* | 10/2022 | Shah | | H04L 63/102 |

* cited by examiner

UNIVERSAL SOFTWARE COMMUNICATION BUS

CROSS-REFERENCE TO RELATED APPLICATIONS

The present application claims priority to U.S. Provisional Application No. 63/113,085, entitled "UNIVERSAL SOFTWARE COMMUNICATION BUS", and filed on Nov. 12, 2020. The entire contents of the above-listed application are hereby incorporated by reference for all purposes.

FIELD

The disclosure relates to a communication bus for various applications, such as audio, video, automotive, etc.

BACKGROUND

Software buses may be used to facilitate connections and communication between software modules. A software bus may operate as a communication bridge within, for example, an electronic control unit (ECU) of a vehicle, an operating system (OS), or a computing process. As such, the software bus may enable seamless integration of information and execution of software modules for a system, such as an audio system, a video system, a vehicle system, etc.

The software bus, however, may be single transport protocol oriented for a single system. Application of the software bus across a network may therefore demand additional code to be written for each type of transport protocol in the network and when new clients are incorporated. In order to effectively bridge various software modules of the network, each bridge software component may be hand coded, thereby increasing a time and effort to maintain operation of the software bus.

SUMMARY

Embodiments are disclosed for a universal software bus. In one example, a device for a communications control system includes a distributed component interconnect framework (DCIF) configured to enable communication between different software modules of a communications network based on already existing code. In this way, a flexible deployment of software modules in different ECUs, OSs, or processes can be achieved without having to rewrite software components when new local or remote clients are added.

For example, the DCIF may abstract the system deployment and cover an entire network, including multiple transport protocols and further may avoid multiple hand coded bridge software components by allowing point to point communication. Such an approach may be applicable to a connected vehicle, thereby allowing different software modules of the vehicle communications control system to communicate without demanding addition of new code.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below.

DETAILED DESCRIPTION

Figure 1:
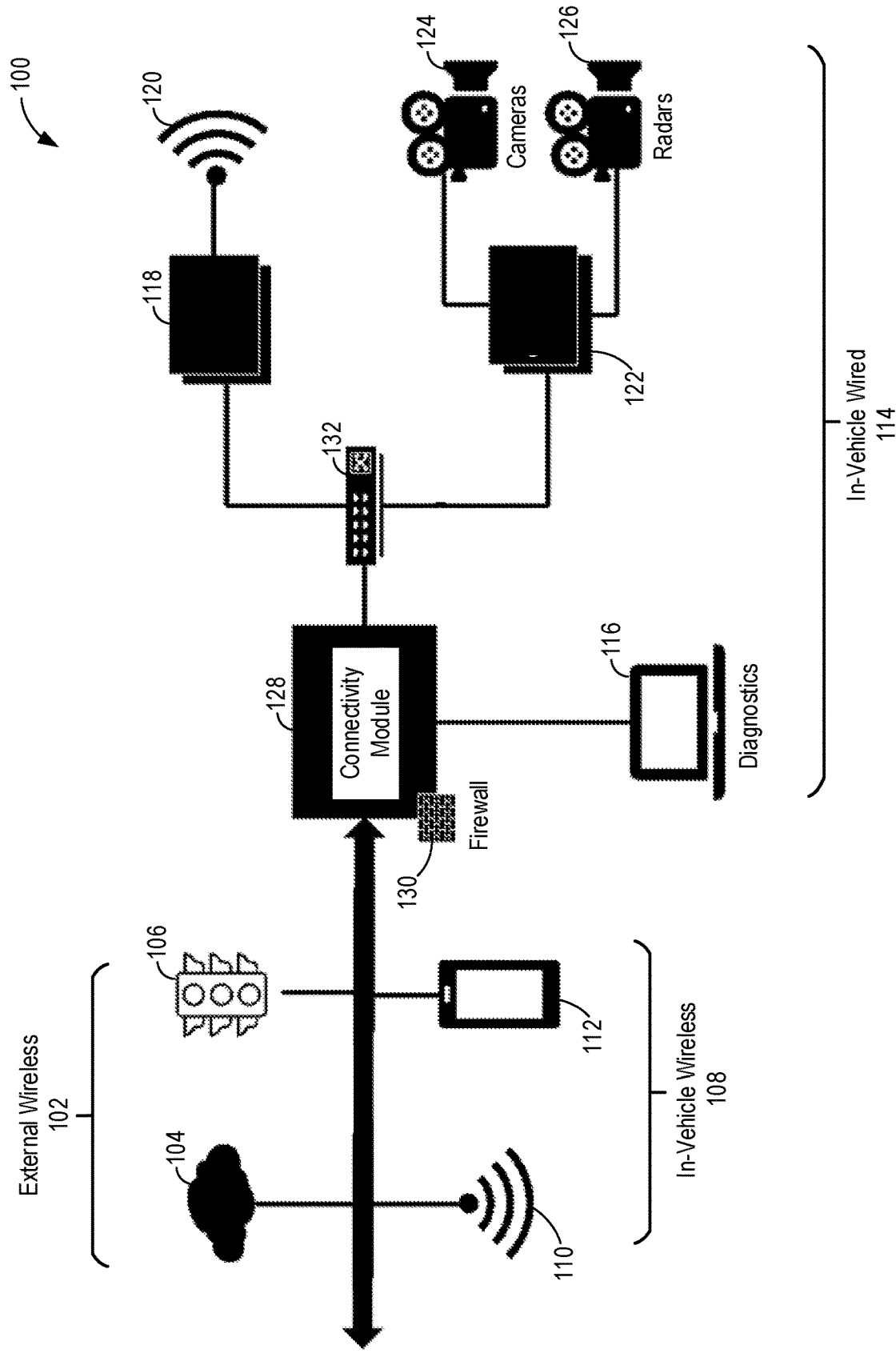
FIG. 1 shows a network of systems which may be communicatively connected by a connectivity module which may be implemented as a multi-platform software bus in accordance with one or more embodiments of the present disclosure.
Figure 2:
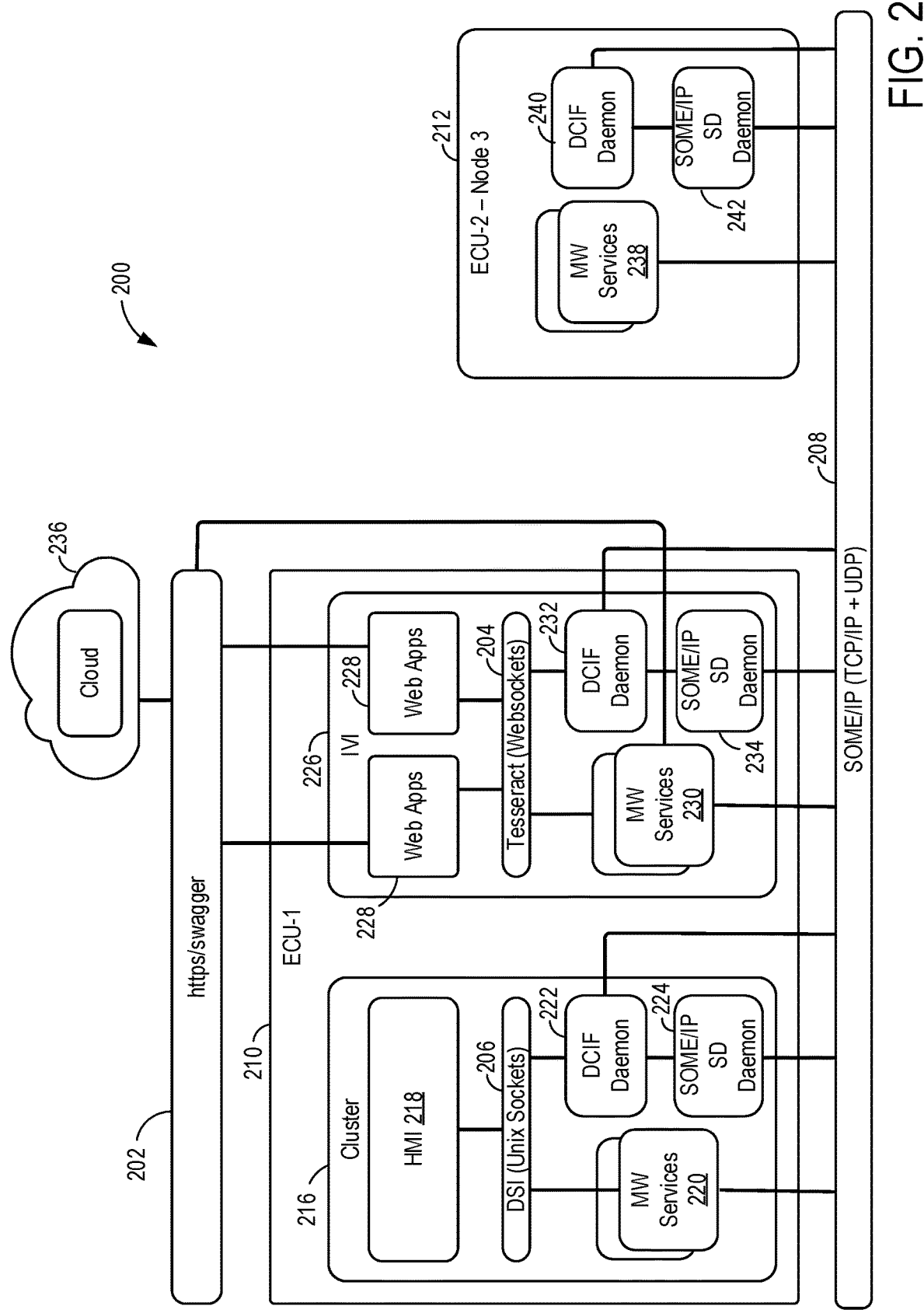
FIG. 2 shows a diagram of a first example of a computing system in which the multi-platform software bus may be incorporated in accordance with one or more embodiments of the present disclosure.
Figure 3:
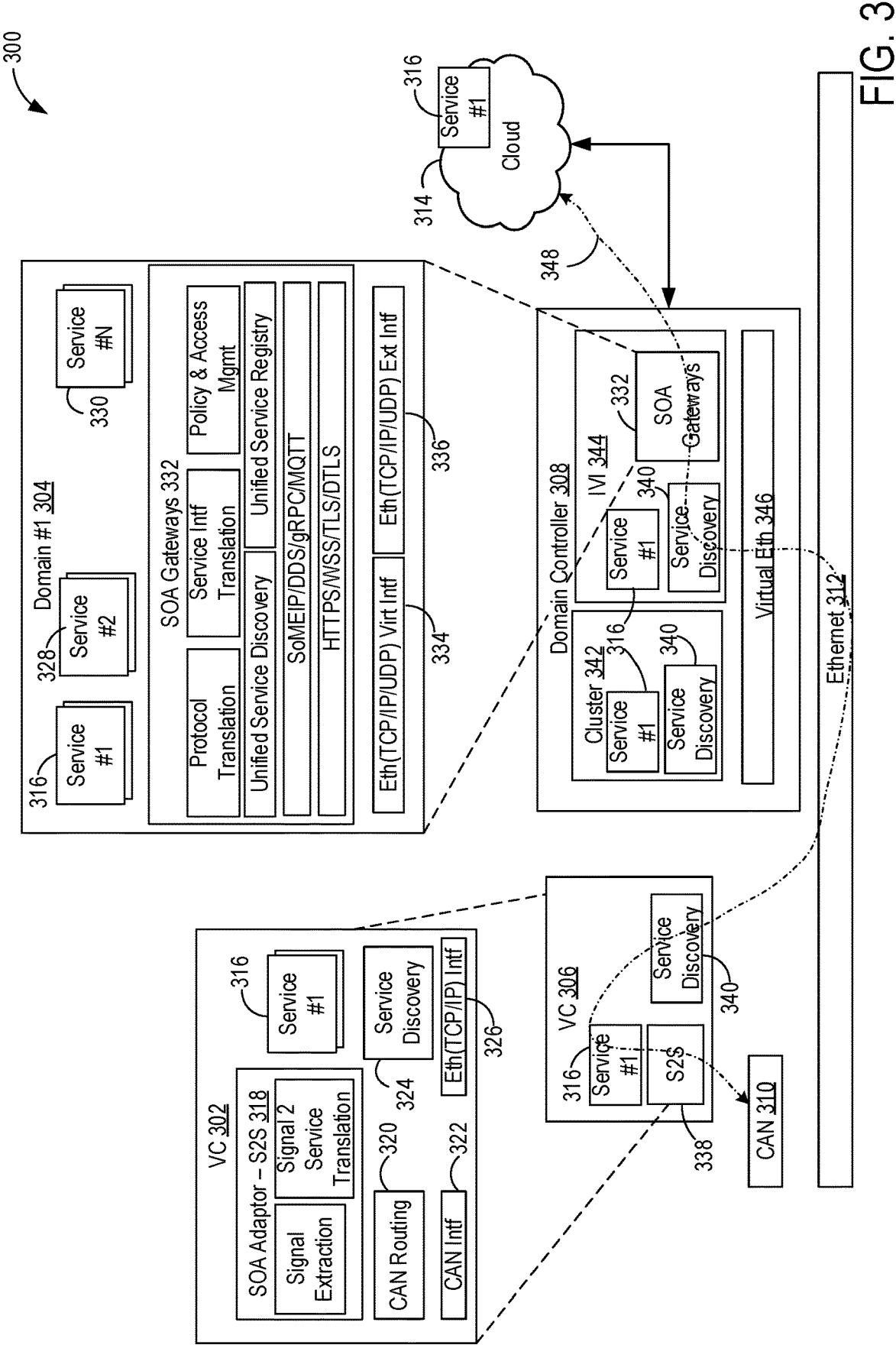
FIG. 3 shows a diagram of a second example of a computing system in which the multi-platform software bus may be incorporated in accordance with one or more embodiments of the present disclosure.
Figure 4:
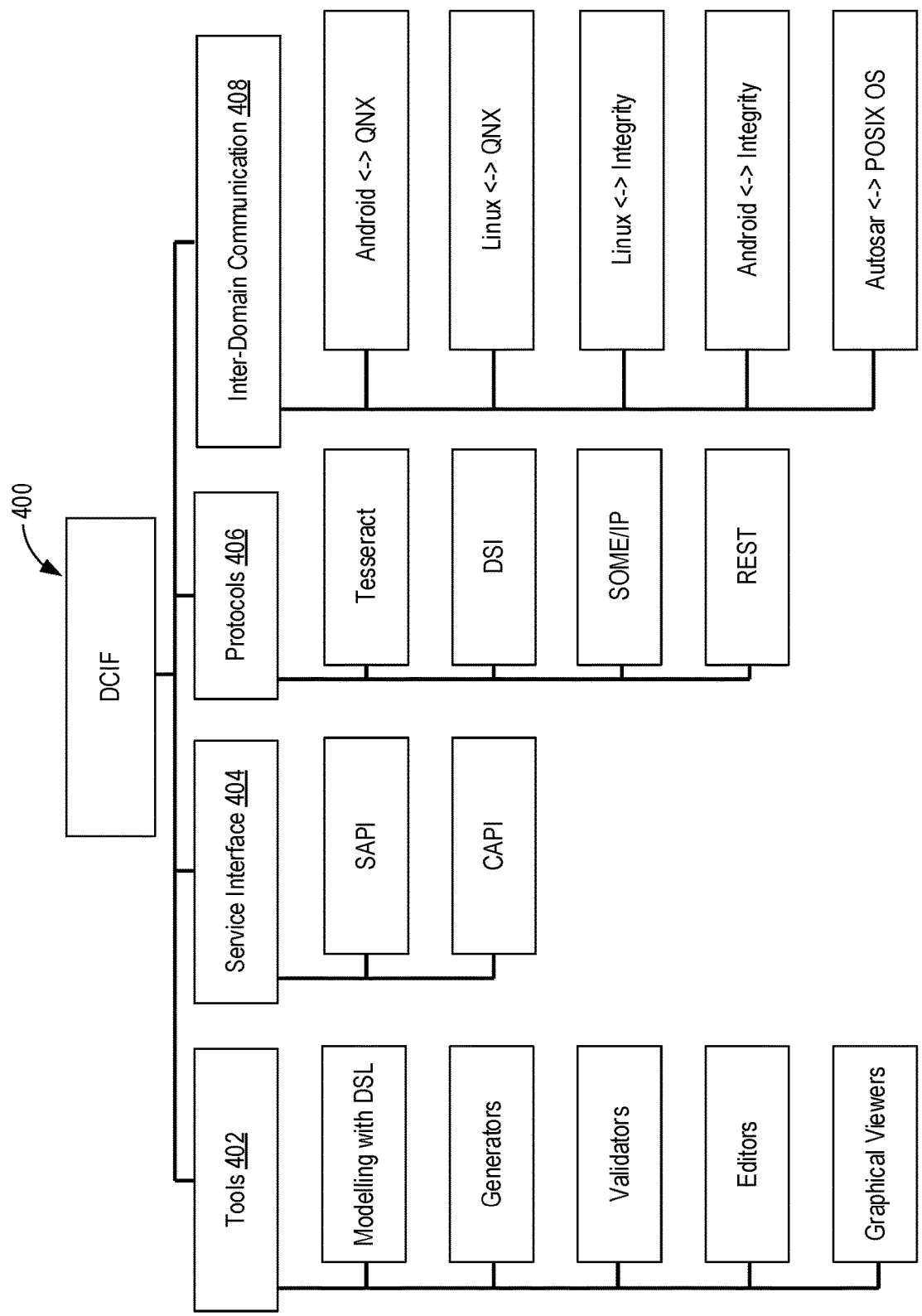
FIG. 4 shows an example of a diagram of the multiplatform software bus in accordance with one or more embodiments of the present disclosure.
Figure 5:
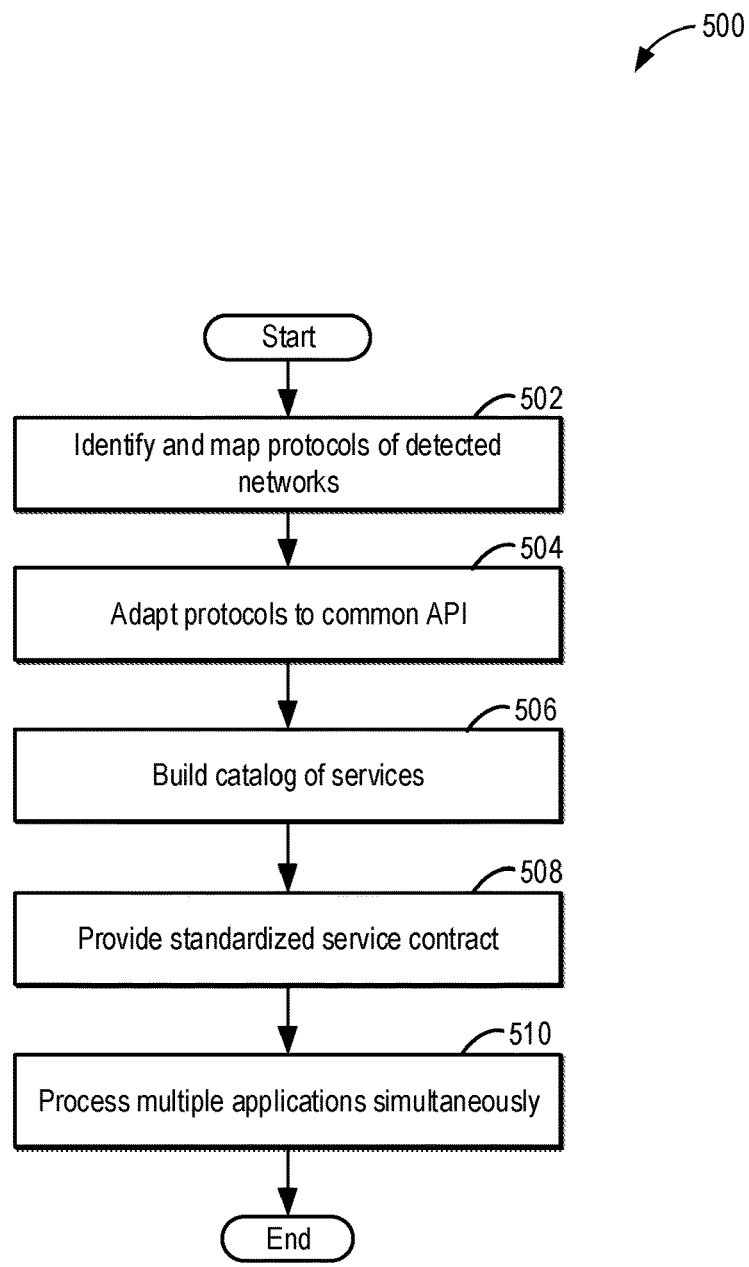
FIG. 5 shows an example of a method for implementing the multi-platform software bus in a communications control system.

Systems and methods are provided for a multi-platform software bus. In one example, the software bus may be a universal multi-platform software communication bus (also referred to as a Distributed Component Interconnect Framework or DCIF). The DCIF may allow communication amongst a network of systems, as shown in FIG. 1. Examples of networks in which the DCIF may be applied are illustrated in FIGS. 2 and 3. An architecture of the DCIF, as depicted in FIG. 4, may allow the DCIF to utilize model driven development to obtain higher levels of abstraction. A method for implementing the DCIF in a communications control system is depicted in FIG. 5, illustrating processes enabled by the DCIF. The approach described herein represents an example of a strategy to build secure polyglot distributed applications and services. While the example architecture illustrated herein is described, various alternatives may also be used, such as noted herein.

As described herein, a universal software communication bus (aka DCIF, Distributed Component Interconnect Framework) may be implemented. The DCIF is a technology that allows flexible deployment of software modules in different electronic control units (ECUs), operating systems (OSs), or processes without demanding software components to be rewritten when new local or remote clients are added. The DCIF also allows communication on different transport protocols such as Scalable Service-oriented Middleware over Internet Protocol (SoME/IP), e.g., for automobiles, and websockets simultaneously without demanding extra code to be written in the client or server.

As such, flexibility of deployment for dynamic system requirements between different customers is increased. In an example, one approach allows software components to be deployed in the same or different ECUs\OS\Hypervised guest OS s or across the internet while depending exclusively on or exclusively providing DCIF software interfaces of interest. The DCIF software bus may manage one or more of security, access control, privileges, discovery of services, N-number of transport protocols, encryption, and interface version compatibility.

In one example, implementation of the DCIF may include use of standardized service contracts. For example, the system may enable use of domain specific language (DSL) such as Franca Interface Definition Language (FIDL) for defining and transforming software interfaces, and Component Description Language (CDL) for describing an interface and behavior of software components. In another example, the DCIF may enable service discoverability. For example, the DCIF may support dynamic service discovery as well as static configurations. The DCIF Daemon, e.g., a long-running background process of the DCIF configured to answer requests, may build a catalog of services available over different protocols and configure the policies and priorities for services in some or every node, e.g., amongst different nodes of a communications control system.

In yet another example, implementation of the DCIF may include service abstraction, which may hide the deployment details of the services behind a standardized service contract. A single service may be made available on a different communication bus. Furthermore, service composability may be enabled, which may allow multi-process applications to be deployed across different ECUs. Each ECU may be a controller having a processor and memory with instructions stored therein, including communication protocols for communicating on a network bus.

The DCIF may receive data over different communication protocols and distribute the data to applications via a consistent application programming interface (API) while hiding a complexity of a process for doing so. In addition, the DCIF may support protocol translators used to convert data from one protocol to another. As such, the DCIF may be deployed in a variety of communications control systems, including but not limited to digital cockpits (configured with Infotainment and Cluster), advanced driver-assistance systems (ADAS), telematics units (TCU), rear seat entertainment units, front passenger display modules, as well as implementation in cloud platforms.

In some examples, the DCIF may be implemented in a connected vehicle. Such an approach may also be in addition to, or in place of, other software bus technologies such as dbus, which may be single transport protocol oriented or configured specifically for a single system. As shown in FIG. 1, the DCIF may enable various systems of a vehicle to be communicatively coupled, by a single connectivity module in which the DCIF may be deployed.

Turning now to FIG. 1, an example of a vehicle system 100 of services and clients is shown. The system 100 may include an external wireless network 102, including a cloud platform 104 and a Vehicle 2 Everything (V2X) communication system 106, as well as an in-vehicle wireless network 108, which may include a Hot Spot network 110 and a Bring Your Own Device (BYOD) system 112. The system 100 may further include an in-vehicle wired network 114. The in-vehicle wired network 114 may encompass a diagnostics system 116, input/output (I/O) controllers 118 configure to control vehicle sensors 120, and a compute node 122 to control equipment such as cameras 124, and radars 126.

At least a portion of the services and clients of the vehicle system 100 may depend on non-hardware based connectivity, e.g., the external wireless network 102 and the in-vehicle wireless network 108, while others may be hardware dependent, e.g., the in-vehicle wired network 114. For example, data from the sensors 120 may be processed in a zonal controller, the cloud platform 104 may support Infotainment services, the V2X communication system 106 may demand specific infrastructure, the cameras 124 and radars 126 may demand dedicated ECUs. A technology providing simultaneous communication between the various services and clients that also enables seamless integration of, for example, hand-held devices linked by the BYOD system 112, is therefore desirable.

For example, as illustrated in FIG. 1, the services and clients may be communicatively coupled by a connectivity module 128. The connectivity module 128 may be equipped with a network security device 130, such as a firewall. At least a portion of the in-vehicle wired network 114 may be selectively coupled to the connectivity module 128 by a switch 132. By configuring the connectivity module 128 as a DCIF, a multi-platform based middleware is provided which allows communication across different types of networks, such as the networks depicted in FIG. 1. Additionally, the DCIF is a single bus, thereby minimizing a complexity of the connectivity module 128.

The DCIF may be included in a network of communication buses, as shown in FIG. 2 in a first example of implementation of the DCIF within a network 200 of communication buses. In one example, the network 200 may include components installed in a communications control system of a vehicle, at a server, at other computing systems, etc. Communication between software modules of the network 200 is enabled by the DCIF. The network 200 includes an http/swagger bus 202, a tesseract bus 204 (e.g., for websockets), a Distributed Service Interface (DSI) bus 206 (e.g., for Unix sockets), and a SoME/IP bus 208 (which may use Transmission Control Protocol/Internet Protocol, TCP/IP or User Datagram Protocol, UDP). A first ECU 210, in which the tesseract bus 204 and the DSI bus 206 are implemented, and a second ECU 212 are included in the network 200. The first ECU 210 and the second ECU 212 may be communicatively coupled by the SoME/IP bus 208.

The first ECU 210 may be implemented in a vehicle communications control system, for example, and may include an instrument cluster 216 (hereafter, cluster 216) which may be a node of a Digital cockpit. Various applications, middleware and databases may be supported by the cluster 216. The cluster 216 may include a human-machine interface (HMI) 218 communicatively coupled to the DSI bus 206. The DSI bus 206 is also communicatively coupled to Middleware (MW) Services 220, where the MW Services 220 provides services and capabilities to applications beyond those offered by an operating system, and a DCIF Daemon 222.

The DCIF Daemon 222 may build a catalog of services available over different protocols. Additionally, the DCIF Daemon 222 may configure policies and priorities for services specific to the cluster 216. The MW Services 220 may be communicatively coupled to the SoME/IP bus 208. The DCIF Daemon 222 may also be communicatively coupled to the SoME/IP bus 208 both directly and indirectly via a SOME/IP Service Data (SD) Daemon 224. The SoME/IP Service Data (SD) Daemon 224 may specify a format, message sequence, and semantics of the SoME/IP.

The first ECU 210 may also be equipped with an In-Vehicle Infotainment (IVI) subsystem 226. The IVI subsystem 226 may be configured to control various hardware and software in a vehicle providing audio and video entertainment, including automotive navigation systems, video players, USB and Bluetooth connectivity, steering wheel audio controls, and hands-free voice control. The IVI subsystem 226 may include a plurality of web applications 228 which may be communicatively coupled to the https/swagger bus 202 and the tesseract bus 204. Similar to the DSI bus 206, the tesseract bus 204 may be communicatively coupled to MW Services 230 and a DCIF daemon 232. The MW Services 230 may be communicatively coupled to the https/swagger bus 202 and the SoME/IP bus 208. The DCIF Daemon 222 may also be communicatively coupled to the SoME/IP bus 208 both directly and indirectly via a SoME/IP Service Data (SD) Daemon 234. The https/swagger bus 202 may also be communicatively coupled to a cloud platform 236.

The second ECU 212 may be a node of the network 200. For example, the second ECU 212 may be a connection point able to receive, create, store or send data, e.g., via the SOME/IP bus 208. The second ECU 212 may be equipped with MW Services 238 and a DCIF Daemon 240, which may each be directly communicatively coupled to the SOME/IP bus 208. The DCIF Daemon 240 may also be indirectly coupled to the SOME/IP by a SOME/IP SD Daemon 242.

By incorporating the DCIF into the network, e.g., installing the DCIF Daemon into each of the first ECU 210 and the second ECU 212, applications from different ECUs of the network 200 may be processed. The DCIF may allow additional ECUs to be added to the network 200 and communicatively coupled to one another without altering or adding new code. Use of various software modules in the ECUs may also be enabled efficiently.

A second example of implementation of the DCIF within an Ethernet-based control network 300 for a vehicle is shown in FIG. 3. Integration of Ethernet into the control network 300 may be desirable to increase connectivity and may eventually replace use of a controller area network (CAN). However, at least initially, a combination of Ethernet and the CAN may be included in the control network 300. For example, the control network includes entities such as a first vehicle controller (VC) 302, a first domain 304, a second VC 306, a domain controller 308, and a cloud platform 314. The entities may receive and transmit signals via a CAN 310 and Ethernet 312 and may each include a first service 316 which translates the received and transmitted signals using the DCIF such that the entities may communicate with one another.

Each entity may be equipped with various tools, applications, and transport protocols in addition to the first service 316. For example, the first VC 302 may include a Service Oriented Architecture (SOA) adaptor 318 for Signal-to-Service (S2S), CAN routing 320, a CAN interface 322, a service discovery 324, and an Ethernet (TCP/IP) interface 326. The SOA adaptor 318 may further include signal extraction and S2S translation.

For example, the S2S may provide a tool or infrastructure to enable transmission of signals over legacy protocols such as the CAN 310, a Local Interconnect Network (LIN), FlexRay, etc., to appear as services over the SOA adaptor 318. Use-case connecting signals may therefore be built between, for example, a network edge and a cloud platform.

The first domain 304 may include a second service 328 and additional services up to N services 330, SOA Gateways 332, an Ethernet (TCP/ICP/UDP) virtual interface 334, and an Ethernet (TCP/ICP/UDP) external interface 336. The SOA Gateways 332 may be a set of service infrastructure hosting tools such as protocol translation, service interface translation, policy and access management, unified service discovery, unified service registry, protocols such as SoME/IP, Data Distribution Service (DDS), gRPC, and MQTT, and secure protocols such as HTTPS, WSS, TLS and DTLS.

The second VC 306 may include S2S 338 and service discovery 340. The domain controller 308 may include a cluster 342, IVI 344, and virtual Ethernet 346. Each of the cluster 342 and the IVI 344 may be equipped with service discovery 340 and the IVI 344 may further include the SOA Gateways 332.

Communication links may be established between common components of the entities. For example, the first domain 304 may communicate with the domain controller 308 through the SOA Gateways 332 and the first VC 302 may communicate with the second VC 306 through the SOA Adaptor 318 and the S2S 338.

By using the tools, applications, and protocols shown in FIG. 3, such as S2S, signals over CAN (as well as other legacy protocols including local interconnect networks (LIN) and FlexRay) may appear as services, e.g., the first service 316, over the DCIF. The DCIF may enable a path of capabilities indicated by dashed line 348 which may include conversion of CAN signals to services, discovery of the services at runtime, communication via Ethernet, service interface and protocol translation to expose the interfaces over the cloud platform 314, and communication with cloud service via secure and authenticated channels. By implementing the DCIF in a vehicle communications control system, interoperation of the different transport protocols of the network 300 is enabled, thereby allowing complex end to end use-cases to be built. Different Ethernet-based communication protocols across the vehicle may be used and managed by a single software bus. Even as the communication protocols evolve with new vehicle models or variants on vehicle models, communication between the different services and clients of the network is maintained by the DCIF.

The DCIF may provide model driven development for a user, e.g., a developer, thereby enabling higher levels of abstraction in a software bus than conventional, single transport oriented buses. The user may thereby direct more attention to other aspects of a model, such as business logic, rather than enabling and managing communication between software modules of a network. An example of a DCIF 400 is shown in FIG. 4, illustrating various elements included in the DCIF which allows the DCIF to manage complex tasks under a single service contract.

For example, the DCIF 400 may include a plurality of elements, such as tools 402, a service interface 404, protocols 406, and inter-domain communication 408. The tools 402 may include modeling using DSL, generators for generating code, validators, editors, graphical viewers, etc. The service interface 404 may include a Service Application Programming Interface (SAPI), and a Common Application Programming Interface (CAPI). The protocols 406 may include a tesseract protocol, a Distributed Service Interface (DSI), a SoME/IP protocol, as well as a software architectural style such as Representational State Transfer (REST). The inter-domain communication 408 may include communication between Android platforms and QNX operating systems, between Linux operating systems and QNX operating systems, between Linux operating systems and Integrity operating systems, between Android platforms and Integrity operating systems, and between Automotive open system architecture (Autosar) and Portable Operating System Interface (POSIX) operating systems. It will be noted that the framework shown in FIG. 4 for the DCIF is a non-limiting example and other examples may include additional elements not shown in FIG. 4.

Model driven development is thereby aided by powerful code generators, by a service interface that hides protocols while allowing for high levels of abstraction, protocols such as automotive middleware protocols that may be used for control messages, and protocol translators and bridges for communication between different operating platforms and systems.

A method 500 for enabling communication between different networks of a vehicle system is depicted in FIG. 5. The method 500 may be executed in a vehicle system such as the vehicle system 100 of FIG. 1, configured with various networks and each network communicating via a different transport protocol. A DCIF may be implemented at a connectivity module, e.g., the connectivity module 128 of FIG. 1, of the vehicle system, the DCIF configured with elements shown in FIG. 4. It will be appreciated that an ordering of the operations shown in FIG. 5 is non-limiting, and the order of operations may vary. In other words, the order of operation may occur sequentially or may be carried out concurrently, in part or in entirety, or in a different order, etc.

At 502, the method includes identifying and mapping the different transport protocols of the networks. For example, identification of the networks may include confirming whether the network is wireless or wired. Mapping the networks may include determining a specific type of transport protocol corresponding to each of the networks.

At 504, the method includes adapting each type of transport protocol to a common API. For example, the common API may be described by a common DSL such that each service provided by the networks may be defined and discoverable. Protocol translators may be used to translate the transport protocols. The common API may abstract multiple protocols protocol, increasing a flexibility of the DCIF to consume data regardless of transport type, thereby precluding a demand to for code changes.

At 506, the method includes building a catalog of services based on the identified networks and transport protocols. A standardized service contract may be provided at 508, which may hide deployment details of the services. Multiple applications may be processed simultaneously at 510 of the method, thereby allowing different software modules to be deployed regardless of host configuration without demanding re-writing of existing code or adding new code.

In this way, a DCIF may allow system deployment across a network with high abstraction. The network may include multiple transport protocols and communication between different transport protocols may be enabled by the DCIF without demanding new code to be written or added to a client or server. Implementation of the DCIF also mitigates addition of new code when clients are added to the network. The protocols may be hidden behind a standardized service interface. As a result, polyglot distributed applications and services may be built in a secure and efficient manner.

A technical effect of applying the DCIF to a communication network is that communication between different types of operating systems, ECUs, and processes is enabled based on already existing code.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as shown in the vehicle system 100 of FIG. 1. The methods may be performed by executing stored instructions with one or more logic devices (e.g., processors) in combination with one or more additional hardware elements, such as storage devices, memory, hardware network interfaces/antennas, switches, actuators, clock circuits, etc. The described methods and associated actions may also be performed in various orders in addition to the order described in this application, in parallel, and/or simultaneously. The described systems are exemplary in nature, and may include additional elements and/or omit elements. The subject matter of the present disclosure includes all novel and non-obvious combinations and sub-combinations of the various systems and configurations, and other features, functions, and/or properties disclosed.

The disclosure also provides support for a device for a communications control system, comprising: a distributed component interconnect framework (DCIF) configured to enable communication between different software modules of a communications network based on already existing code. In a first example of the system, the DCIF uses domain specific language (DSL) to define interfaces and components arranged on different nodes and/or domains. In a second example of the system, optionally including the first example, the DCIF is configured to support one or more of dynamic service discovery and static configuration. In a third example of the system, optionally including one or both of the first and second examples, the DCIF includes a DCIF Daemon configured to build a catalog of services available over different protocols and to manage policies and priorities for services in each node of the communications control system. In a fourth example of the system, optionally including one or more or each of the first through third examples, the DCIF is configured to manage one or more of security, access control, privileges, discovery of services, N-number of transport protocols, encryption, and interface version compatibility. In a fifth example of the system, optionally including one or more or each of the first through fourth examples, the DCIF is configured to hide deployment details of services provided by the DCIF behind a standardized service contract. In a sixth example of the system, optionally including one or more or each of the first through fifth examples, the DCIF is implemented in a communications control system of a vehicle.

The disclosure also provides support for a method for a communications control system, comprising: operating a distributed component interconnect framework (DCIF) to identify and map networks of the communications control system, translating protocols of the networks to a common protocol via the DCIF to enable communication between the networks, building a catalog of services and providing a standardized service contract based on services provided by the networks, and processing multiple applications simultaneously, the multiple applications configured for different types of hosts. In a first example of the method, operating the DCIF to identify and map the networks includes determining a configuration of each of the networks and a transport protocol type corresponding to each of the networks. In a second example of the method, optionally including the first example, translating the protocols of the networks includes defining interfaces and components across different nodes and/or domains using a domain specific language. In a third example of the method, optionally including one or both of the first and second examples, building the catalog of services includes providing service abstraction by hiding deployment details of the catalog of services behind a standardized service contract.

The disclosure also provides support for a communications control system, comprising: one or more transport protocols, a distributed component interconnect framework (DCIF) implemented in a connectivity module of the communications control system, the DCIF configured to allow communication between the one or more transport protocols. In a first example of the system, the DCIF is configured with a plurality of tools to enable model driven development and wherein the plurality of tools includes code generators. In a second example of the system, optionally including the first example, the plurality of tools further includes one or more of modeling with domain specific language, validators, editors, and graphical viewers. In a third example of the system, optionally including one or both of the first and second examples, the DCIF is configured with a plurality of service interfaces. In a fourth example of the system, optionally including one or more or each of the first through third examples, the plurality of service interfaces includes one or more of a Service Application Programming Interface (SAPI), and a Common Application Programming Interface (CAPI). In a fifth example of the system, optionally including one or more or each of the first through fourth examples, the DCIF is configured with a plurality of communication protocols and wherein the plurality of communication protocols are middleware protocols used for control messages. In a sixth example of the system, optionally including one or more or each of the first through fifth examples, the plurality of communication protocols includes one or more of Tesseract, Distributed Service Interface (DSI), Scalable Service-oriented Middleware over Internet Protocol (SoME/IP), and Representational State Transfer (REST). In a seventh example of the system, optionally including one or more or each of the first through sixth examples, the DCIF is configured with inter-domain communication and wherein the inter-domain communication includes protocol translators and bridges between operating systems. In a eighth example of the system, optionally including one or more or each of the first through seventh examples, the inter-domain communication enables communication between one or more of Android platforms and QNX operating systems, Linux operating systems and QNX operating systems, Linux operating systems and Integrity operating systems, Android platforms and Integrity operating systems, Automotive open system architecture and Portable Operating System Interface operating systems.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," and "third," etc. are used merely as labels, and are not intended to impose numerical requirements or a particular positional order on their objects. The following claims particularly point out subject matter from the above disclosure that is regarded as novel and non-obvious.

The invention claimed is:

1. A method for a communications control system of a vehicle, comprising:
   operating a distributed component interconnect framework (DCIF) to enable communication between a plurality of different software modules of a communications network based on already existing code;
   building, with a DCIF Daemon, a catalog of services available over different protocols of the plurality of different software modules;
   providing a standardized service contract based on the catalog of services available over the different protocols of the plurality of different software modules; and
   using, with the DCIF, domain specific language (DSL) to define interfaces and components arranged on different nodes and/or domains,
   wherein the communications network includes a Scalable Service-oriented Middleware over Internet Protocol (SoME/IP) bus of the vehicle; and
   wherein each of the plurality of different software modules is implemented in an electronic control unit (ECU) of the vehicle that is coupled to the SoME/IP bus.

2. The method of claim 1, wherein the DSL is selected from a group consisting of: Franca Interface Definition Language (FIDL); and Component Description Language (CDL).

3. The method of claim 1, wherein the DCIF is configured to support one or more of dynamic service discovery and static configuration.

4. The method of claim 1, further comprising: building, with the DCIF Daemon, the catalog of services available over different protocols to manage policies and priorities for services in each node of the communications control system.

5. The method of claim 4, further comprising: managing, with the DCIF, one or more of security, access control, privileges, discovery of services, N-number of transport protocols, encryption, and interface version compatibility.

6. The method of claim 1, further comprising:
   hiding, with the DCIF, deployment details of the catalog of services behind the standardized service contract to provide service abstraction; and
   processing multiple applications simultaneously, the multiple applications configured for different types of hosts.

7. A method for a communications control system, comprising:
   operating a distributed component interconnect framework (DCIF) to identify and map a plurality of networks of the communications control system, and to determine a configuration of each of the plurality of networks and a plurality of transport protocol types corresponding with the plurality of networks;
   translating protocols of the plurality of networks to a common protocol via the DCIF to enable communication between the plurality of networks over a Scalable Service-oriented Middleware over Internet Protocol (SoME/IP);
   building, with a plurality of DCIF Daemons corresponding with the plurality of transport protocol types, a catalog of services available over the protocols of the plurality of networks, providing a standardized service contract based on services provided by the plurality of networks, and providing service abstraction by hiding deployment details of the catalog of services behind the standardized service contract; and
   processing multiple applications simultaneously, the multiple applications configured for different types of hosts,
   wherein each of the plurality of transport protocol types has a bus coupled to one of the plurality of DCIF Daemons;
   wherein each of the plurality of DCIF Daemons is directly coupled to a bus of the common protocol; and
   wherein each of the plurality of DCIF Daemons is indirectly coupled to the bus of the common protocol through one of a corresponding plurality of Service Data (SD) Daemons of the bus of the common protocol.

8. The method of claim 7, wherein translating the protocols of the plurality of networks includes defining interfaces and components across different nodes and/or domains using a domain specific language.

9. A method for a communications control system, comprising:

operating a distributed component interconnect framework (DCIF) in a connectivity module of the communications control system to allow communication between a plurality of transport protocols through a plurality of communication busses of a network of communication busses, the plurality of communication busses corresponding with the plurality of transport protocols;

building a catalog of services available over different protocols of the plurality of transport protocols; and providing a standardized service contract based on the catalog of services provided by the plurality of communication busses, wherein a first electronic control unit (ECU) implements a first communication bus of the plurality of communication busses, a first DCIF Daemon, and a first Scalable Service-oriented Middleware over Internet Protocol (SoME/IP) Daemon;

wherein the first communication bus is communicatively coupled to the first DCIF Daemon;

wherein the first DCIF Daemon is communicatively coupled to an SoME/IP bus of the network, both directly and indirectly through the SoME/IP bus of the network;

wherein a second ECU implements a second communication bus of the plurality of communication busses, a second DCIF Daemon, and a second SoME/IP Daemon;

wherein the second communication bus is communicatively coupled to the second DCIF Daemon; and wherein the second DCIF Daemon is communicatively coupled to the SoME/IP bus of the network, both directly and indirectly through the SoME/IP bus of the network.

10. The method of claim 9, further comprising: using, with the DCIF, a plurality of tools to enable model driven development, wherein the plurality of tools includes code generators.

11. The method of claim 10, wherein the plurality of tools further includes one or more of modelling with domain specific language, validators, editors, and graphical viewers.

12. The method of claim 9, wherein the DCIF is configured with a plurality of service interfaces.

13. The method of claim 12, wherein the plurality of service interfaces includes one or more of a Service Application Programming Interface (SAPI), and a Common Application Programming Interface (CAPI).

14. The method of claim 9, wherein the DCIF is configured with a plurality of communication protocols and wherein the plurality of communication protocols are middleware protocols used for control messages.

15. The method of claim 14, wherein the plurality of communication protocols includes one or more of Tesseract, Distributed Service Interface (DSI), and Representational State Transfer (REST).

16. The method of claim 9, wherein the DCIF is configured with inter-domain communication and wherein the inter-domain communication includes protocol translators and bridges between operating systems.

17. The method of claim 16, wherein the inter-domain communication enables communication between one or more of Android platforms and QNX operating systems, Linux operating systems and QNX operating systems, Linux operating systems and Integrity operating systems, Android platforms and Integrity operating systems, Automotive open system architecture and Portable Operating System Interface operating systems.

18. The method of claim 9,
wherein the first ECU implements a first Middleware (MW) service;
wherein the first communication bus is communicatively coupled to the first MW service;
wherein the first MW service is communicatively coupled to the SoME/IP bus of the network;
wherein the second ECU implements a second MW service;
wherein the second communication bus is communicatively coupled to the second MW service; and
wherein the second MW service is communicatively coupled to the SoME/IP bus of the network.

19. The method of claim 9, further comprising:
providing service abstraction by hiding deployment details of the catalog of services behind the standardized service contract; and
processing multiple applications simultaneously, the multiple applications configured for different types of hosts.

* * * * *